(12) United States Patent
Spencer et al.

(10) Patent No.: US 7,111,142 B2
(45) Date of Patent: Sep. 19, 2006

(54) SYSTEM FOR QUICKLY TRANSFERRING DATA

(75) Inventors: Andrew M. Spencer, Eagle, ID (US); Tracy Ann Sauerwein, Boise, ID (US)

(73) Assignee: Seagate Technology LLC, Scotts Valley, CA (US)

(*) Notice: Subject to any disclaimer, the term of this patent is extended or adjusted under 35 U.S.C. 154(b) by 262 days.

(21) Appl. No.: 10/243,263

(22) Filed: Sep. 13, 2002

(65) Prior Publication Data

US 2004/0054847 A1    Mar. 18, 2004

(51) Int. Cl.
*G06F 12/00* (2006.01)

(52) U.S. Cl. .................................... 711/170; 711/104
(58) Field of Classification Search ............... 711/100, 711/154; 710/68
See application file for complete search history.

(56) References Cited

U.S. PATENT DOCUMENTS

| | | | | |
|---|---|---|---|---|
| 5,237,460 A | * | 8/1993 | Miller et al. ................... 360/8 |
| 5,490,260 A | * | 2/1996 | Miller et al. ................. 711/100 |
| 5,812,817 A | | 9/1998 | Hovis et al. |
| 5,959,930 A | * | 9/1999 | Sakurai .................. 365/230.03 |
| 6,145,069 A | * | 11/2000 | Dye .............................. 711/170 |
| 6,215,727 B1 | * | 4/2001 | Parson et al. ............... 365/233 |
| 6,731,290 B1 | * | 5/2004 | Cui .............................. 345/503 |

FOREIGN PATENT DOCUMENTS

EP      0 339 224      11/1989

* cited by examiner

*Primary Examiner*—Mano Padmanabhan
*Assistant Examiner*—Kaushik Patel
(74) *Attorney, Agent, or Firm*—David K. Lucente; Derek J. Berger

(57) ABSTRACT

Data storage systems and methods for writing data into a memory component and reading data from the memory component are disclosed. By utilizing a high-speed data controller, the systems and methods transfer data at a fast data transfer rate. In one implementation, the memory component comprises a memory controller for managing data within the memory component. The memory controller comprises the high-speed data controller and a data manager. The data manager comprises a compression/decompression engine that compresses and decompresses data and a storage device interface.

34 Claims, 8 Drawing Sheets

SYSTEM FOR QUICKLY TRANSFERRING DATA

CROSS-REFERENCE TO RELATED APPLICATIONS

This application is related to U.S. patent application Ser. No. 10/295,651, filed on Nov. 15, 2002, and entitled "Transferring Data in Selectable Transfer Modes," published as U.S. Patent Application Publication No. 2004/0098545 A1. which is hereby incorporated by reference in its entirety herein.

TECHNICAL FIELD OF THE INVENTION

The present invention is generally related to data storage and retrieval. More particularly, the present invention is related to systems and methods for writing data to memory cards and reading data from memory cards utilizing a fast parallel data transfer scheme.

BACKGROUND OF THE INVENTION

Developers have manufactured different types of solid-state memory devices for storing digital data. These memory devices can be packaged into what is known as memory cards, which have increased in popularity in recent years. Memory cards are used in a variety of applications, such as in digital cameras and camcorders, music players, personal digital assistants (PDAs), personal computers, etc. These memory cards are typically very small in size and have specific physical specifications, or form factors. Typical memory cards have a data storage capacity in a range from about 2 megabytes (MB) to about 1 gigabyte (GB).

Although many memory cards provide large volumes of memory, the data transfer rate for storing large files into memory and retrieving files from memory are sometimes rather slow. For instance, if a photographer uses a digital camera that is capable of taking 5 pictures per second and if each picture includes about 5 MB of data, the memory card must be capable of storing data at a rate of at least 25 MB per second. Existing memory cards are not capable of such transfer rates. In another example, suppose the photographer stores about 100 pictures in memory and each picture is about 5 MB. Although the pictures may be stored on a 512 MB memory card, with a slow data transfer rate, it may take up to 20 minutes to upload the pictures into a computer.

One solution to the slow data transfer rate has been to supply the host devices (such as digital cameras) with large amounts of static random access memory (SRAM) and dynamic random access memory (DRAM). SRAM and DRAM are volatile memory and may act as data buffers for non-volatile memory devices. These data buffers temporarily store data as it is being written to the memory devices or read from the memory devices so that the data is not lost. However, because of the slow data transfer rate into the non-volatile memory devices, data may get backed up in the data buffers, preventing the user from storing additional information until the data is eventually stored in the non-volatile memory. Another problem with this solution is that SRAM and DRAM are relatively expensive and tend to drive up the cost of the host devices. Thus, a need exists in the industry to provide a higher performance, faster data transfer rate, and lower cost alternative to the SRAM and DRAM solution and to address the aforementioned deficiencies and inadequacies.

SUMMARY OF THE INVENTION

The present disclosure includes a data storage system for quickly transferring data between a host device and memory. One embodiment of the data storage system comprises a memory controller, which manages data within a memory component. The memory controller includes a data controller having parallel outputs, a data buffer connected to the data controller, and a data manager. The data manager may further comprise a compression/decompression engine and data and control outputs connected to memory.

Another embodiment of the data storage system comprises a memory card that is removably attached to a host. The memory card comprises a plurality of memory banks and a memory controller connected to the memory banks. The memory controller comprises an ATA or DMA controller, a data buffer, and a data manager having a compression/decompression engine that compresses and decompresses data. The data manager further comprises a storage device interface having a plurality of outputs connected to the plurality of memory banks.

BRIEF DESCRIPTION OF THE DRAWINGS

Many aspects of the invention can be better understood with reference to the following drawings. Like reference numerals designate corresponding parts throughout the several views.

DETAILED DESCRIPTION OF THE INVENTION

The present disclosure describes systems and methods for overcoming the inadequacies of the prior art. These systems and methods improve the existing memory cards by increasing the data transfer rate to provide faster storage and retrieval times, while at the same time conforming to the form factor of commonly-used memory cards, such as CompactFlash™ or the like. A memory controller, described herein, is preferably located in the memory card and includes data controlling circuitry for quickly transferring data between a host and memory. Not only can the data controlling circuitry be configured to transfer data at a fast rate, but also the data controlling circuitry can be configured to compress data in real-time, which enhances the storage capacity of the media. The data controlling circuitry can be considered as a distinct aspect from the compression circuitry. Therefore, the data controlling circuitry may be implemented independently and incorporated into the memory controller with or without the compression circuitry, and vice versa.

Figure 1:
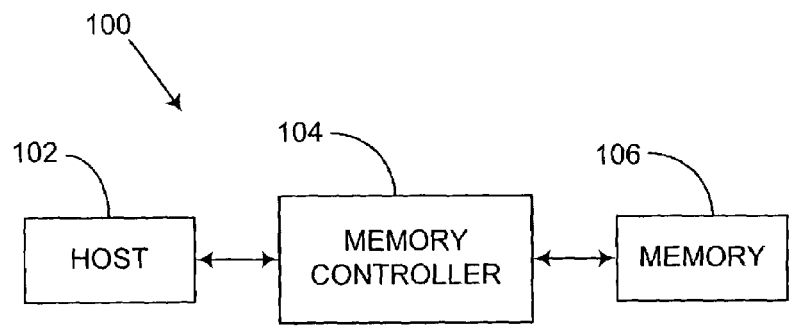
FIG. 1 is a block diagram of a general overall view of an embodiment of a data storage system.

An overall view of an embodiment of a data storage system 100 is shown in FIG. 1. This figure illustrates a host 102 connected to a memory controller 104, which is further connected to memory 106. The host 102 may be any type of user device that reads data from memory 106 and/or writes data to memory 106. For example, the host 102 may be a processing system in a digital camera, which, in a data writing mode, is capable of capturing an image in digital form and writing the digital data representative of the captured image into memory 106. In a data-reading mode, the digital camera processing system may then retrieve data from memory 106 to upload data into a computer or to display images on a liquid crystal display (LCD), for example. Alternatively, the host 102 may be a processing system of an audio player that reads music data from memory 106 and audibly plays the music over a set of speakers. The audio player processing system may include data-writing capabilities such that music may be recorded in memory 106. The host 102 may optionally be configured as any other well-known system that utilizes memory 106, such as a processing system of a personal digital assistant (PDA), a processing system of a digital camcorder, etc.

The memory controller 104 is electrically connected between the host 102 and memory 106. The memory controller 104 manages the transfer of data from the host 102 to memory 106 during a data writing command and the transfer of data from memory 106 to the host 102 during a data reading command. In one preferred embodiment, the memory controller 104 and memory 106 are grouped together on a type of memory card that includes controller functionality and storage capability. However, according to an alternative embodiment, the memory controller 104 may be located within the host 102. In this alternative embodiment, when the memory controller 104 compresses data using a particular algorithm and stores the compressed data on a separate memory component, the data can only be read back by the same host 102 or by a host that has a memory controller that comprises the same compression and decompression algorithms.

Figure 2:
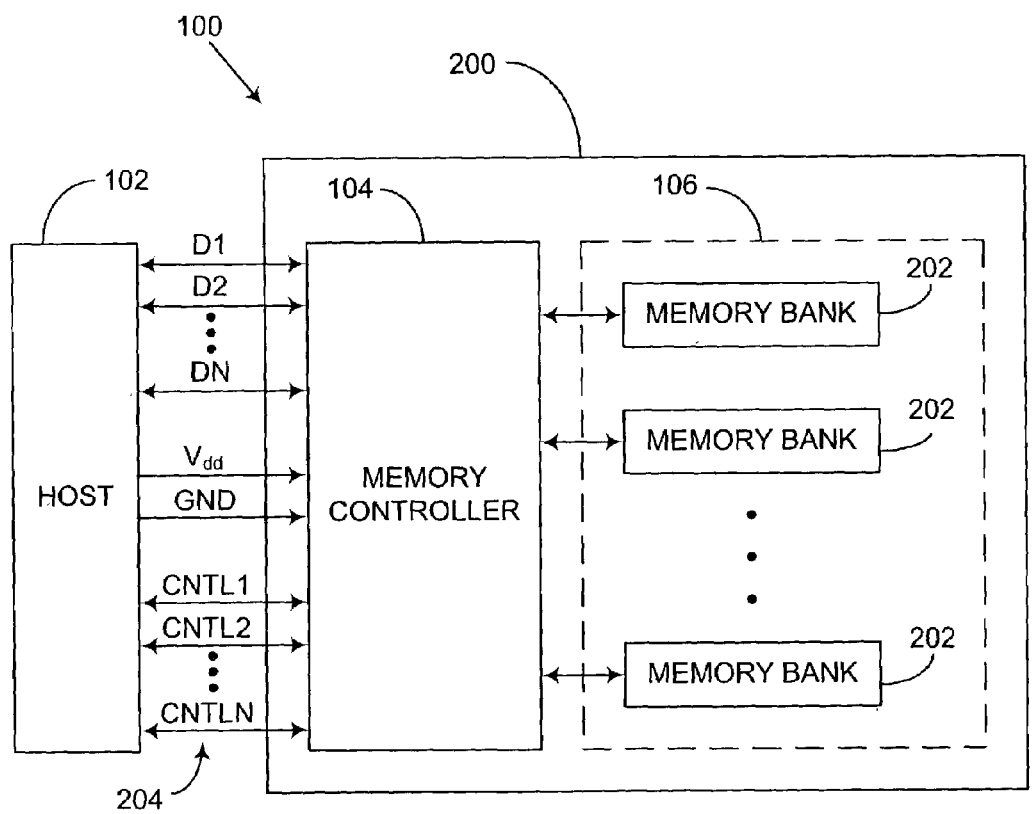
FIG. 2 is a block diagram illustrating an example embodiment of the data storage system of FIG. 1.

FIG. 2 is an embodiment of the data storage system 100 wherein the memory controller 104 and memory 106 are contained on a memory card 200. The memory card 200 may have any size, shape, pin configuration, and storage capacity. For example, the memory card 200 may be formed having the same form factor and specifications as well-known memory cards used in the market today, such as Compact Flash™ or the like. The memory card 200 may be backward compatible with these or other memory devices that are in existence today and may be compatible with those that are developed in the future.

Memory 106 is shown in FIG. 2 as a plurality of memory banks 202, but may be configured as a single memory bank 202. The number of memory banks 202 may depend upon the ability of the particular memory banks 202 to transfer data as well as the data transfer rate of storage interface circuitry within the memory controller 104. The number may further depend upon the desired data transfer rate, as is described in more detail below. Data is preferably transferred between the memory controller 104 and the memory banks 202 in blocks or sectors. Each block or sector of data may have a predetermined block size, such as 512 bytes, for example, to conform to whatever block size the host 102 accesses data. The memory banks 202 comprise memory components that are capable of a high performance transfer of data blocks at fast data transfer speeds, such as, for instance, magnetic random access memory (MRAM) or atomic resolution storage (ARS).

Further illustrated in FIG. 2 are interface lines 204 between the host 102 and the memory controller 104. The interface lines 204 may include connection terminals, pins, pads, conductors, etc., that electrically connect the terminals of the host 102 with the compatible terminals of the memory card 200. A typical memory card contains specific terminals that are unique to the particular system and that are coupled only with a host having a compatible configuration. Despite the differences in the location and nomenclature of the terminals and lines of different host/card systems, the interface lines 204 of a typical system include a plurality of data lines D1, D2, . . . , DN, a plurality of control lines CNTL1, CNTL2, . . . , CNTLN, at least one power line ($V_{dd}$), and at least one ground line (GND). The control lines may include at least one clock line and at least one command line.

Figure 3:
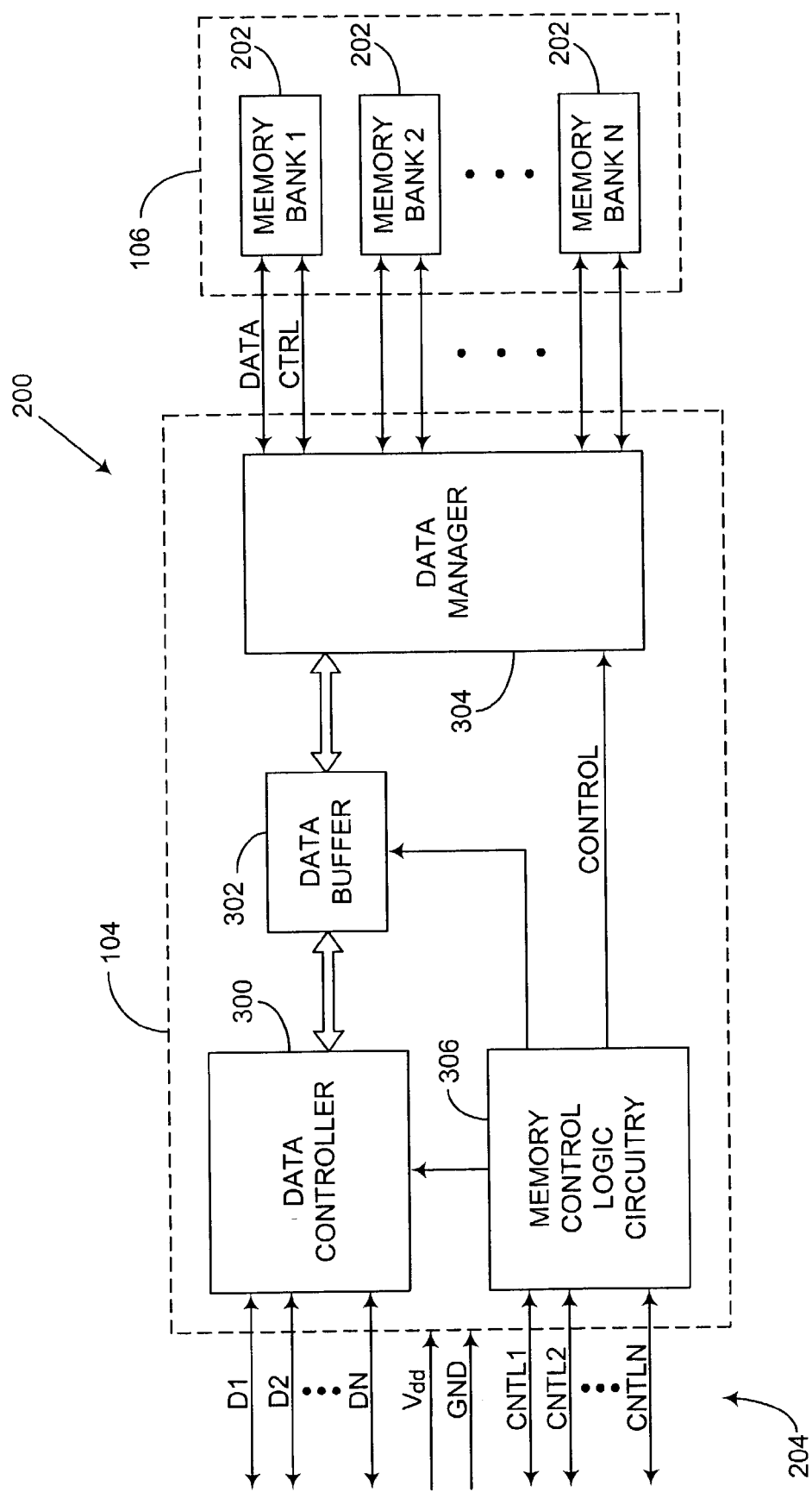
FIG. 3 is a block diagram illustrating the details of an embodiment of the memory controller and memory that are shown in FIGS. 1 and 2.

FIG. 3 is a block diagram showing the details of an embodiment of the memory controller 104 and the memory 106. The interface lines 204 are input into the memory controller 104 such that the data lines D1, D2, . . . , DN are connected to a data controller 300, the control lines CNTL1, CNTL2, . . . , CNTLN are connected to a memory control logic circuitry 306, and the $V_{dd}$ and GND lines are connected to all of the circuit blocks for providing a source a power to the memory controller 104. The data controller 300 combined with the memory control logic circuitry 306 preferably conforms to the IDE/ATA specification that supports DMA operation, wherein data is transferred between the host 102 and memory 106 without passing through a central processing unit (CPU). Furthermore, IDE/ATA devices are capable of data transfer speeds of up to 66 MB per second. For instance, the data controller 300 and memory control logic 306, in conforming to the IDE/ATA specification, are capable of transferring data at 66 MB per second. As new and faster data transfer rates become possible, the components of the memory controller 104 may be changed to provide data transfer speeds greater than 66 MB per second. The designing of the memory controller 104 using a transfer rate of greater than 66 MB per second is described in more detail below.

The data controller 300 further comprises circuitry that is capable of maintaining a parallel data format such that data may be transferred to a data buffer 302 along parallel lines. The data buffer 302 is a high-speed buffer that is capable of maintaining, if needed, the fast data transfer rate, e.g. up to at least 66 MB per second. The data buffer 302 receives data from the data controller 300 at the high data transfer rate at which the data controller 300 is capable of transferring data. The data buffer 302 temporarily holds the data and transfers data along parallel lines to a data manager 304 at the rate at which the data manager 304 is capable of receiving data. When the data transfer rates of the data controller 300 and data manager 304 are different, the data buffer 302 temporarily stores backed-up data that is being transferred to the slower component.

The rate at which the data buffer 302 transfers data to the data manager 304 depends upon the number of memory banks 202 and the data transfer rate capabilities of the memory banks 202. For example, when the memory banks are configured using ARS storage devices, the transfer rate between the data buffer 302 and the data manager 304 may be up to about M×N MB per second, wherein M is the transfer rate performance of an individual ARS memory device and N is the number of ARS memory banks 202 in use. When the memory banks 202 are configured using MRAM storage devices, the transfer rate between the data buffer 302 and the data manager 304 may be up to about M×N MB per second, wherein M is the transfer rate performance of an individual MRAM memory device and N is the number of MRAM memory banks in use. Therefore, depending on the value M, a certain number of memory devices N would be needed to maintain the data transfer rate of 66 MB per second. If each ARS device is capable of transferring data at 12 MB/s (M=12), or if each MRAM device is capable of transferring data at 20 MB/s (M=20), at least six ARS memory banks or at least four MRAM memory banks could be used to maintain the 66 MB/s rate. Alternatively, a combination of any number of ARS and MRAM memory devices may be used together as desired.

The data manager 304 keeps the data grouped in blocks having a block size that is addressable by the data controller 300. The data manager 304 separates the blocks of data onto a number of channels corresponding to the number of memory banks 202 in use. The blocks on each channel are then written substantially simultaneously to the respective memory banks 202, depending on the transfer rate required. The data manager 304 and memory 106 may contain any number of channels and memory banks 202, respectively. The data manager 304 may write the blocks of data into all memory banks simultaneously to thereby increase the data transfer rate. Therefore, the more channels and memory banks 202 provided, the higher the data transfer rate between the data manager 304 and memory 106. If a fast data transfer rate is not desired for any particular reason, the data blocks may be written to the memory banks 202 one at a time, thereby using less instantaneous power. Other power saving schemes can be used wherein a portion of the total number of memory banks are written to at any given time.

The data storage system 100 may be configured to accommodate a desired amount of storage capacity and to transfer data at a desired data transfer rate. The number of memory banks, depicted as N in FIG. 3, may depend on the data transfer rate that is desired. The data manager 304 transmits the separated data to the respective memory banks 202 during a writing procedure. During a reading procedure, the data manager 304 retrieves data from the different memory banks 202 and pieces the data back together. The separating and combining functions of the data manager 304 may be configured in the data manager 304 as a predefined algorithm that the data manager 304 uses to keep track of the location of certain portions of data in each of the different memory banks 202. The data is stored in the memory banks 202 along with control information that is related to the predefined algorithm for maintaining location and address information of the data in the different memory banks 202.

The memory controller 104 of FIG. 3 further comprises memory control logic circuitry 306 that provides control functionality for the memory controller 104. The memory control logic circuitry 306 receives commands from the host 102 along the control lines CNTL1, CNTL2, ..., CNTLN. The host 102 may send additional command data over the data lines D1, D2, ..., DN to the data controller 300. In response to the commands along control lines CNTL1, CNTL2, ..., CNTLN, the memory control logic circuitry 306 provides signals to the appropriate circuits for carrying out the requested command. If an error occurs in the reception of the command from the host 102, the memory control logic circuitry 306 returns an error code back to the host 102 over the control lines to inform the host 102 of the error. If the control lines include a clock CLK, the CLK line provides the system clock signal to the memory control logic circuitry 306 for synchronizing the memory controller 104 with the host 102. The memory control logic circuitry 306 provides signals to the data controller 300, data buffer 302, and data manager 304 for asserting control.

Figure 4:
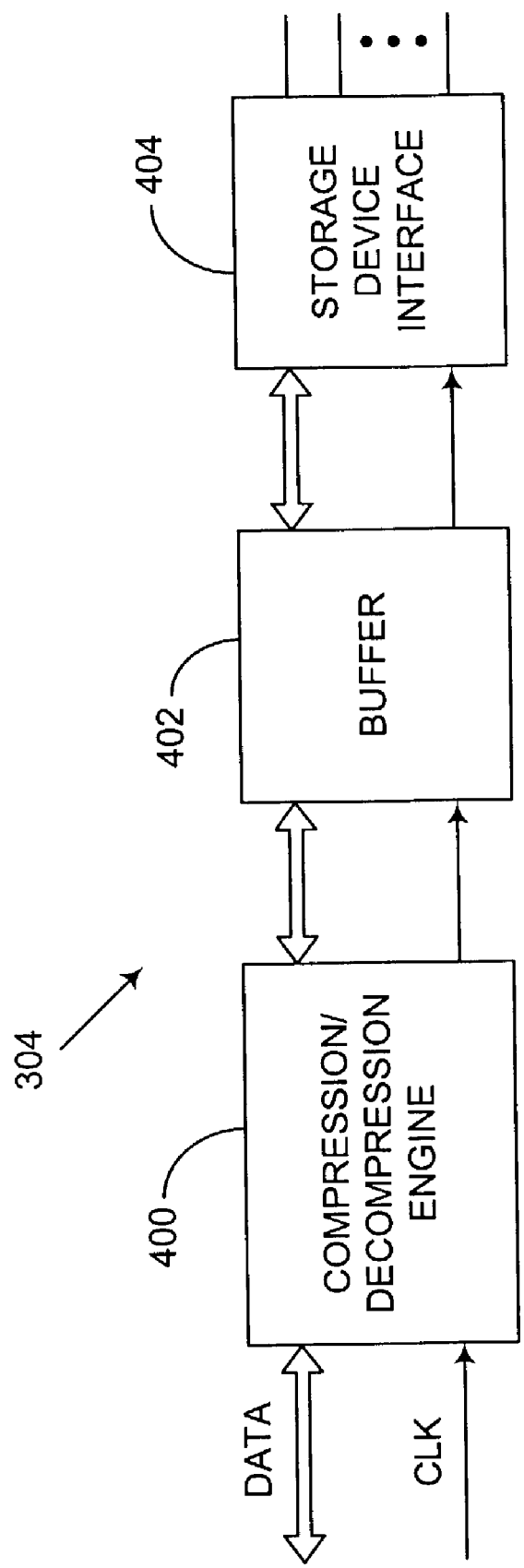
FIG. 4 is a block diagram illustrating the details of an embodiment of the data manager that is shown in FIG. 3.

FIG. 4 is a block diagram of an example embodiment of the data manager 304. Data, transferred to the data manager 304, encounters a compression/decompression engine 400, which comprises circuitry for compressing data during a data writing command. The compression/decompression engine 400 may be added as an optional feature in the data manager 304. The ability of the memory controller 104 to provide a fast data transfer rate does not solely rely upon the operation of the compression/decompression engine 400. Likewise, the compression/decompression engine 400 does not rely upon the operation of the fast data transfer circuitry to perform the compression and decompression procedures.

During a data-reading command, the compression/decompression engine 400 utilizes decompression circuitry to decompress any data that has been compressed using an algorithm known to the decompression circuitry. The fast data transfer speed of the fast data transfer circuitry may be enhanced by the compression/decompression engine 400, allowing slower media to accept data at the same high-speed rate. Since the compression/decompression engine 400 sends less information to memory 106 for storage, the compressed data may be stored much faster than data that is not compressed. Another benefit of adding compression functionality to the memory controller 104 is that less storage space is required in memory, allowing the user to store more data. By compressing data during the writing of data into memory 106, the data takes up less storage space in memory 106. Therefore, the storage capacity of memory 106 may effectively be increased due to this compression of data. A detailed description of an example embodiment of the compression/decompression engine 400 is made below with respect to FIG. 5.

Figure 6:
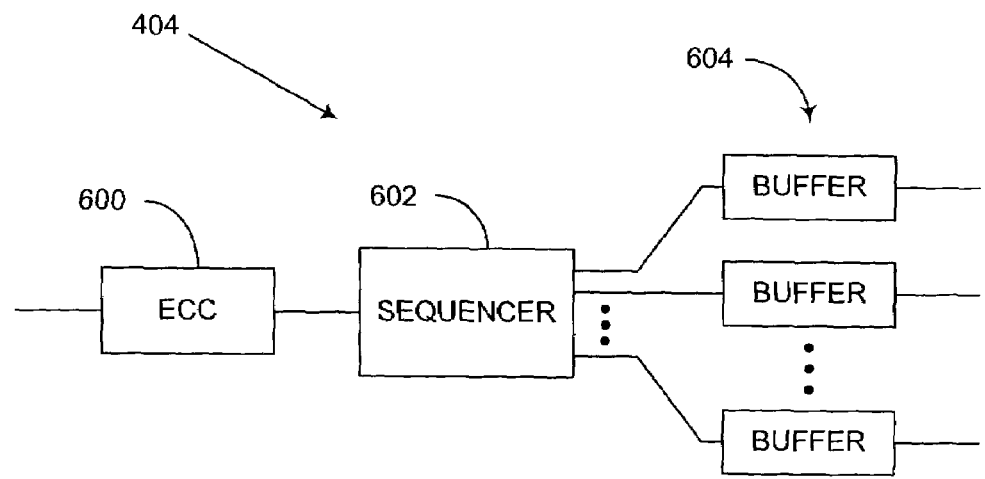
FIG. 6 is a block diagram of a first embodiment of the storage device interface shown in FIG. 4.
Figure 7:
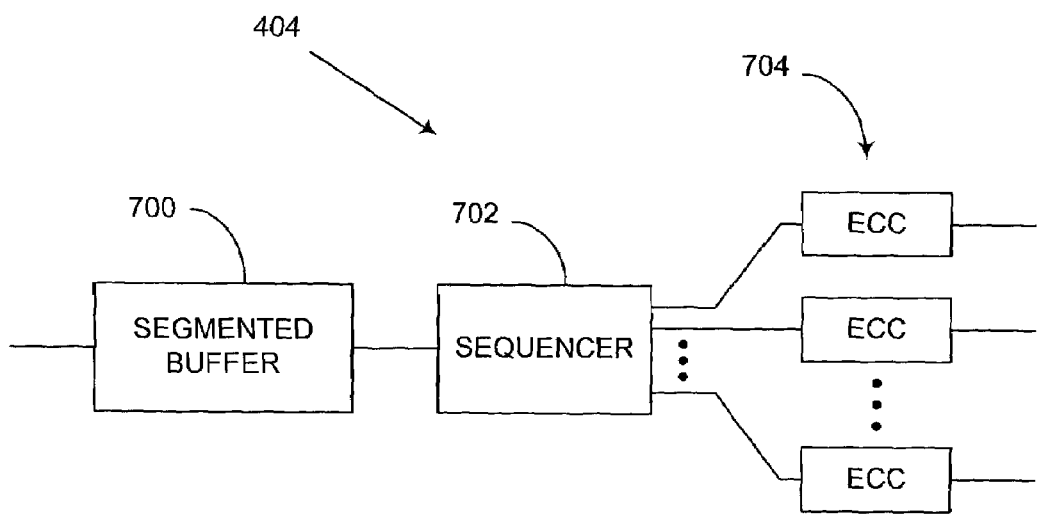
FIG. 7 is a block diagram of a second embodiment of the storage device interface shown in FIG. 4.

The compressed data is transferred between the compression/decompression engine 400 and a buffer 402, which is capable of handling data at the fast transfer rate. During a writing command, the buffer 402 sends data to a storage device interface 404, which includes circuitry that is capable of organizing the compressed data for quick storage. The storage device interface 404 may comprise a sequencer for distributing the serial data among a plurality of paths leading to the plurality of memory banks 202. Preferably, the storage device interface 404 comprises additional buffers for temporarily holding the compressed data as it is being transferred to the memory banks 202. The storage device interface 404 further comprises error correction code (ECC) circuitry for adding parity to the compressed data, which, when read back from memory 106, allows for the detection and correction of errors. Embodiments of the storage device interface 404 are shown in FIGS. 6 and 7 and described in more detail below. The order of the compression/decompression engine 400 and the storage device interface 404 may be reversed. In such a case, the compression of data is the last function performed before storing the data in the memory banks 202 and the decompression of data is the first function performed when data is read from the memory banks 202.

Figure 5:
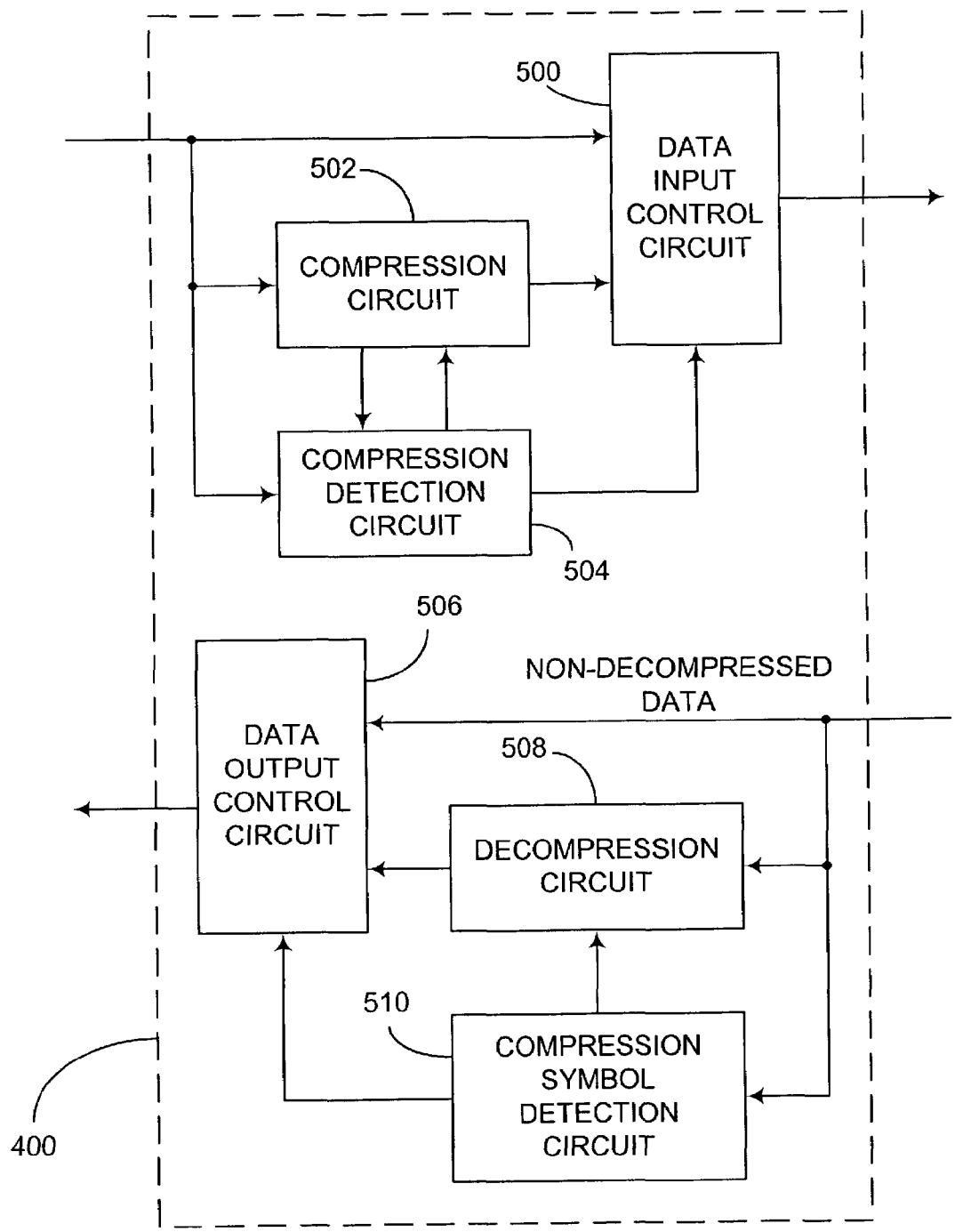
FIG. 5 is a block diagram of an example embodiment of the compression/decompression engine shown in FIG. 4.

FIG. 5 illustrates an embodiment of the compression/decompression engine 400. In a data writing mode, incoming data to the compression/decompression engine 400 travels to a data input control circuit 500, a compression circuit 502, and a compression detection circuit 504. The compression circuit 502 compresses the incoming data and sends the compressed data to the data input control circuit 500 and to the compression detection circuit 504. The compression detection circuit 504, having received the incoming data and the data compressed by the compression circuit 502, compares the two and determines if the incoming data has already been compressed, previous to the compression by the compression circuit 502. The compression detection circuit 504 may make this determination based on the fact that when the compression circuit 502 compresses data that has already been compressed, then the algorithm used by the compression circuit 502 to compress data may actually expand the data. Therefore, if the data is not capable of further compression or if the data is expanded by the compression circuit 502 instead of being compressed, then the compression detection circuit 504 determines that the data has already been compressed.

The compression detection circuit 504 sends a signal to the data input control circuit 500 instructing the data input control circuit 500 to choose between either the incoming data or the compressed data from the compression circuit 502. The compression detection circuit 504 may send an additional signal to the compression circuit 502 to inform the compression circuit 502 that the compression algorithm used is not effective. Consequently, the compression circuit 502, when notified of the ineffective algorithm, may switch to a different algorithm. The compression detection circuit 504 notifies the data input control circuit 500 whether or not the incoming data has already been compressed. If the incoming data has already been compressed, then the data input control circuit 500 ignores the data from the compression circuit 502 and selects the already-compressed incoming data. If the incoming data has not been previously compressed, the data input control circuit 500 ignores the incoming data and selects the compressed data from the compression circuit 502. The data input control circuit 500 transfers the selected data along with a compression indication symbol that may indicate whether the transferred data is the compressed data from the compression circuit 502 or the previously-compressed incoming data. The compression indication symbol may additionally comprise information concerning the type of algorithm that the compression circuit 502 used to compress the incoming data.

When data is read from memory 106, the data is input into the decompression portion of the compression/decompression engine 400. Stored non-decompressed data goes to a data output control circuit 506, a decompression circuit 508, and a compression symbol detection circuit 510. The compression symbol detection circuit 510 detects the compression indication symbol to determine whether or not the stored data was compressed by the compression detection circuit 504 and, if so, the algorithm that was used. When the compression symbol detection circuit 510 determines how the stored data was compressed, the compression symbol detection circuit 510 sends a signal to the decompression circuit 508 to instruct the decompression circuit 508 how to decompress the stored data. The compression symbol detection circuit 510 further notifies the data output control circuit 506 whether or not the stored data was compressed by a known compression algorithm in the compression circuit 502. In response, the data output control circuit 506 selects either the non-decompressed data or the data decompressed by the decompression circuit 508. The data output control circuit 506 transfers the selected data to the output of the compression/decompression engine 400.

FIGS. 6 and 7 illustrate two example embodiments of the storage device interface 404, which acts as an interface between the compression/decompression engine 400 of the memory controller 104 and the memory banks 202. In a writing command, the storage device interface 404 transfers blocks of data to the memory banks 202, and in a reading command, the storage device interface 404 retrieves blocks of data from the memory banks 202. In the embodiment of FIG. 6, the storage device interface 404 transfers serial data from the buffer 402 to a high-speed ECC circuit 600. The ECC circuit 600 is connected to a high-speed sequencer 602, which sends data separated into blocks along a number of branches along paths to a corresponding number of buffers 604. During a data writing command, the ECC circuit 600 receives data from the buffer 402 and adds parity bits to the data. When reading the data from the memory banks 202, the ECC circuit 600 detects the data for errors and corrects any correctable errors in the data and then removes the parity bits and sends the corrected data back to the buffer 402.

During the data writing command, the high-speed sequencer 602 separates the serial data from the ECC circuit 600 into blocks along multiple parallel paths. The number of paths may be four, for example, or any number such that the transfer rate of each buffer 604 times the number of buffers is sufficient to maintain the transfer of data at a speed to keep up with the data controller 300, e.g. 66 MB per second. Buffers 604 temporarily store the data blocks along the paths separated by the sequencer 602 and transfer the data blocks into corresponding memory banks 202. It should be noted that when the data storage system 100 does not require the fast data transfer rate, all but one of the buffers 604 may be idle. In this case, the transfer rate is reduced to about 12 MB per second. However, a power savings may be realized due to the use of only one buffer 604 at a time.

FIG. 7 illustrates an alternative embodiment of the storage device interface 404, wherein, during a data writing command, a high-speed segmented buffer 700 receives serial data and transfers the data to a high-speed sequencer 702 that divides the data into separate blocks or sectors along a number of separate paths. Each block of data is input into a respective ECC circuit 704, which adds parity to the data. The data blocks, with the added parity, is stored in memory banks 202. During a data reading command, the ECC circuits 704 retrieve data blocks from the different memory banks 202, detects any existing errors, corrects the errors, removes the parity bits, and sends the data blocks to the sequencer 702, which then pieces the blocks back together and serially transmits the data back to the segmented buffer 700.

The components of the data storage system 100 can be implemented in hardware, software, firmware, or a combination thereof. In the disclosed embodiments, the host control logic circuitry 318 and memory control logic circuitry 306 may be implemented in software or firmware that is stored in a memory and that is executed by a suitable instruction execution system. If implemented in hardware, as in an alternative embodiment, the processors can be implemented with any or a combination of the following technologies, which are all well known in the art: a discrete logic circuit having logic gates for implementing logic functions upon data signals, an ASIC having appropriate combinational logic gates, a programmable gate array (PGA), a field programmable gate array (FPGA), etc.

Figure 9:
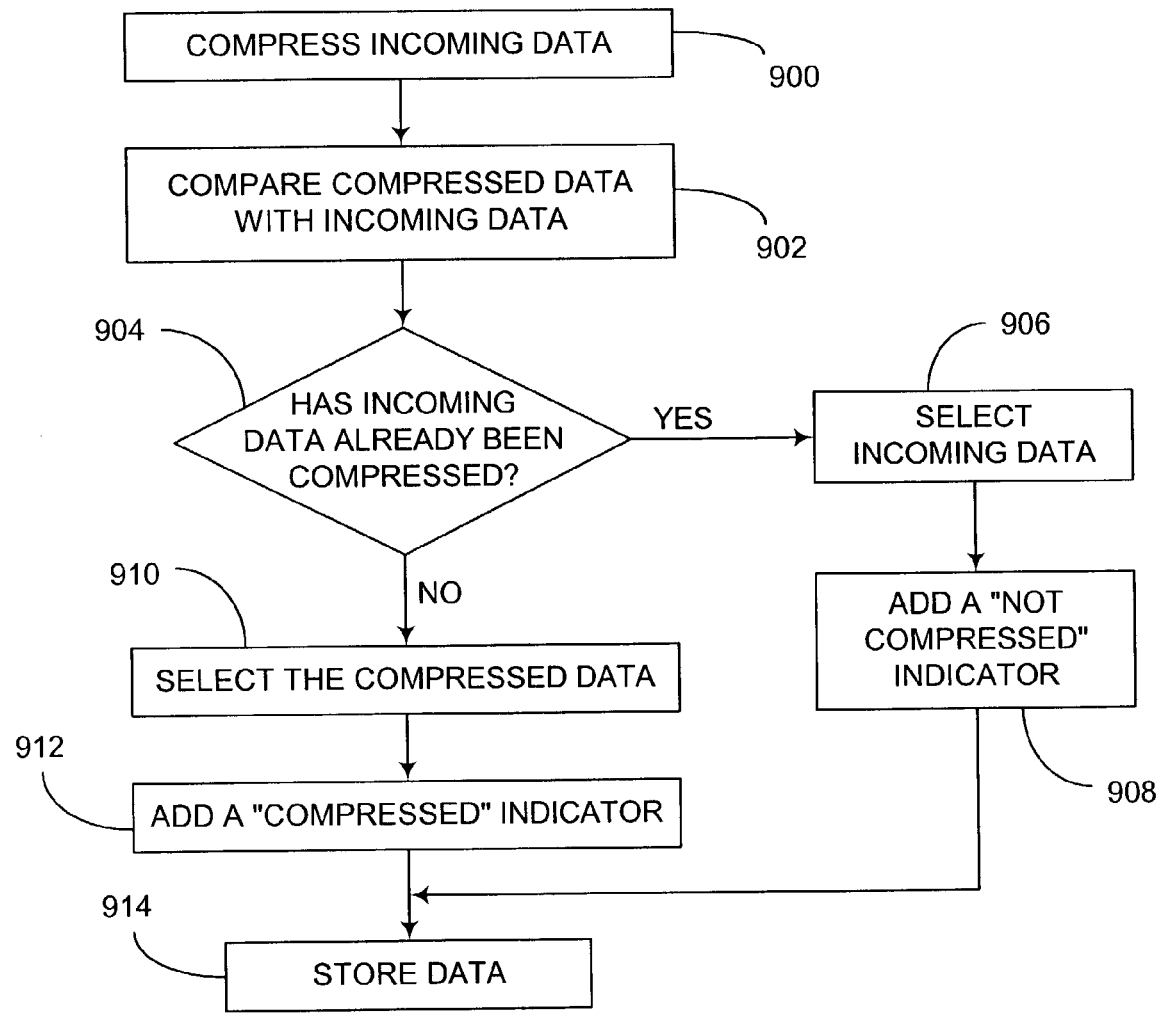
FIG. 9 is a flow chart illustrating the steps of a compression method in an example data-writing command.
Figure 10:
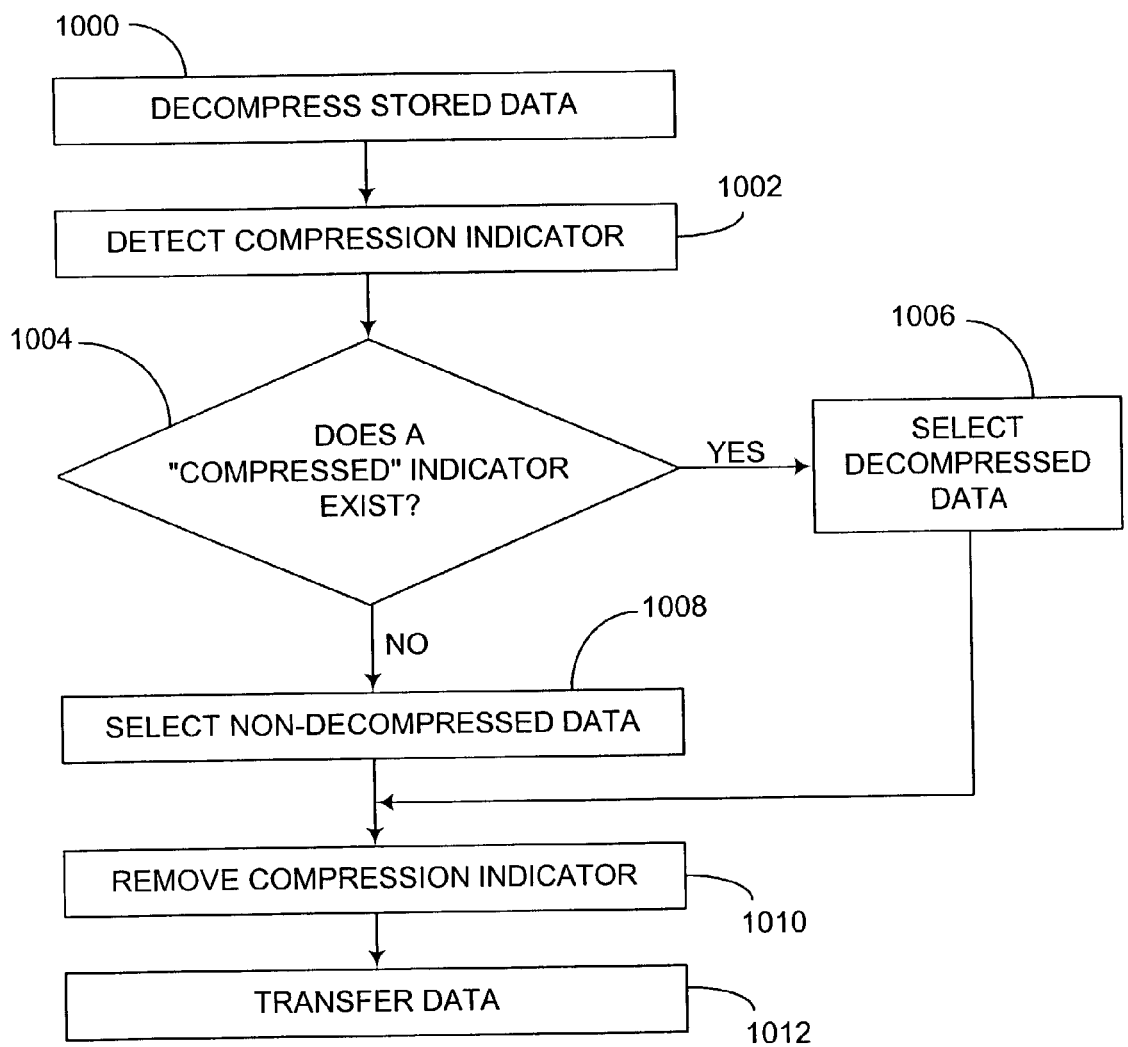
FIG. 10 is a flow chart illustrating the steps of a decompression method in an example data-reading command.

The data storage system 100 described in detail above with respect to FIGS. 1–7 may be designed according to the method described below with respect to FIG. 8. FIGS. 9 and 10 illustrate example embodiments of data-writing and data-reading commands utilizing the compression/decompression engine 400, which is described above and shown in detail in FIG. 5.

Figure 8:
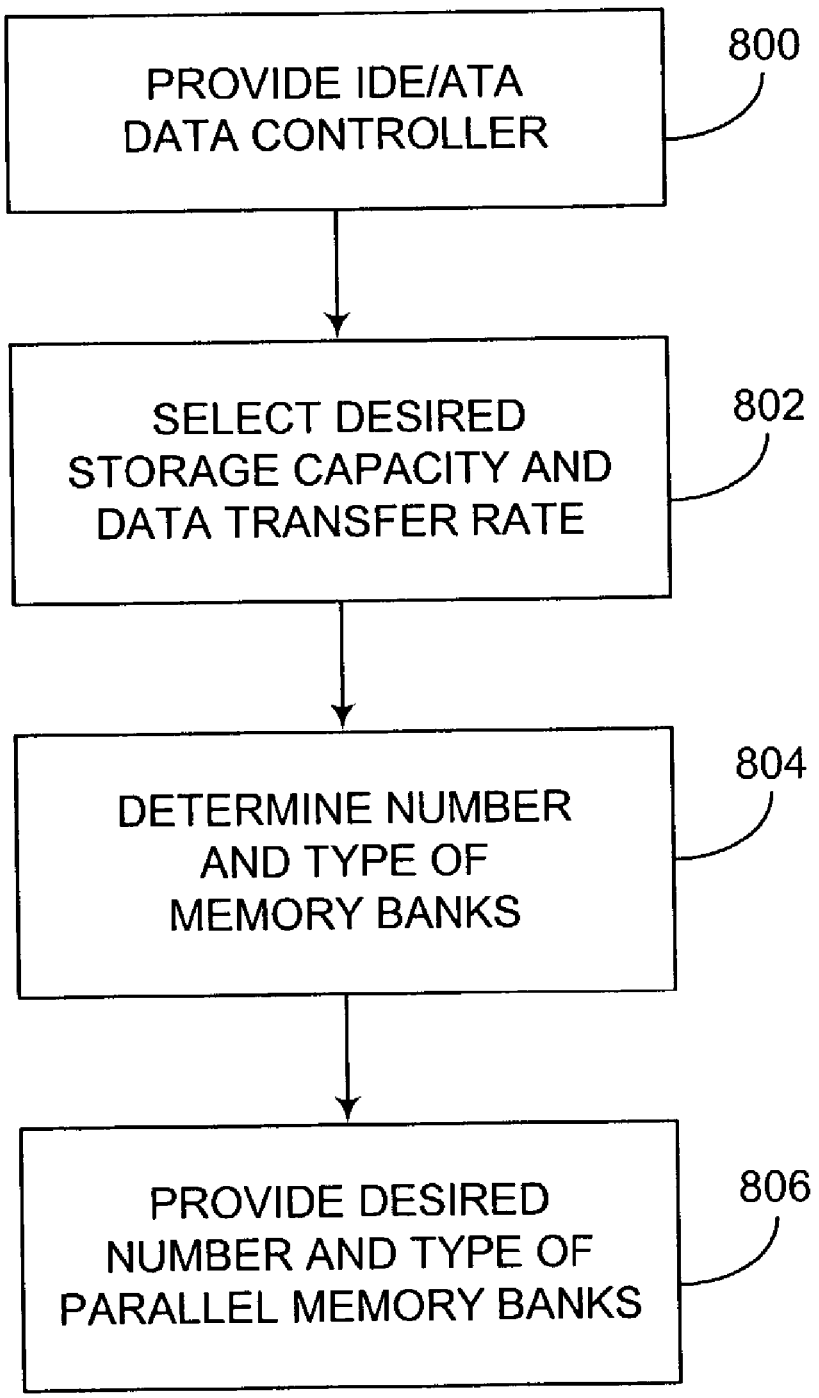
FIG. 8 is a flow chart illustrating an embodiment of a method for designing a memory controller according to desired specifications.

FIG. 8 illustrates an embodiment of a method for designing the memory controller 104 according to desired design specifications. Block 800 shows a first step of providing an IDE/ATA data controller. As mentioned above, the IDE/ATA data controller 300 may be an ATA 66 controller or Ultra DMA controller capable of data transfer rates up to 66 MB per second. Other data controllers that become available in the future may be capable of speeds greater than 66 MB per second. These data controllers may also be provided by the step shown in block 800. As newly developed data controllers increase data transfer rates, the providing step 800 may utilize such data controllers.

Based on the IDE/ATA data controller provided in block 800, a designer may select desired storage specifications, such as storage capacity and data transfer rate, as indicated in block 802. Determination of the data transfer rate is typically limited by the provided data controller and is only as fast as the data controller. However, a rate slower than the capabilities of the data controller may be selected. Based on the desired specifications selected in block 802, the designer determines the number and type of memory banks needed to achieve the desired specifications (block 804). For instance, if ARS memory banks having data transfer speeds up to 12 MB per second are used, a data transfer rate of 12 MB/s times the number of ARS memory banks used may be acquired. As an example, with 5 ARS memory banks, a data transfer rate of up to 60 MB per second may be maintained. MRAM memory banks may allow for even greater speeds, i.e. up to 20 MB per second times the number of MRAM memory banks. With 5 MRAM memory banks, for example, a data transfer rate of up to 100 MB per second may be maintained. Another consideration in the step indicated by block 804 is that ARS memory banks have a greater storage capacity than MRAM memory banks. Depending on both the desired data transfer rate and the desired storage capacity, ARS, MRAM, or a combination of both types of memory banks may be selected.

In block 806, the next step is described. Once the number and type of memory banks has been determined, the designer then provides the memory controller with the desired number and type of memory banks in a parallel configuration. The providing step of block 806 is based on the memory controller used, and more specifically, the data transfer rate of the memory controller. Further, the providing step is based also on the desired specifications and the number and type of memory banks required to meet the desired specifications.

FIG. 9 illustrates a data writing method utilizing the compression/decompression engine 400, wherein the data is compressed before being stored. When the memory controller 104 is configured with the compression/decompression engine 400, the steps of FIG. 9 may be performed. In block 900, the compression circuit 502 compresses the data coming into the compression/decompression engine 400. Then, the compression detection circuit 504 compares the incoming data with the compressed data output from the compression circuit 502, as indicated in block 902. The compression detection circuit 504 uses this comparison to determine whether or not the incoming data was compressed prior to the compression by the compression circuit 502. Decision block 904 indicates the step of determining whether the incoming data was already compression, and, if so, flow continues to step 906. In this step, the compression detecting circuit 504 signals the data input control circuit 500 to select the incoming data and not the compressed data. The data input control circuit 500 selects the incoming data and further adds a compression indication that indicates the current data being stored in memory 106 is "not compressed," as indicated in block 908.

If the compression detection circuit 504 determines in decision block 904 that the incoming data was not already compressed prior to the compressing of data by the compression circuit 502, then the method flow proceeds to block 910. In this step, the compression detection circuit 504 signals the data input control circuit 500 that the incoming data was not previously compressed and that the newly compressed data is to be selected. The data input control circuit 500 selects the compressed data from the compression circuit 502 and adds a compression indicator (block 912) that flags the present data written into memory 106 as "compressed" data. After the selecting steps of blocks 906 and 910 and the compression indication adding steps of blocks 908 and 912, flow proceeds to block 914 where the selected data and corresponding compression indicator are stored into memory 106.

FIG. 10 illustrates an embodiment of a method performed by the compression/decompression engine 400 during a data reading procedure. When the data storage system 100 comprises a compression/decompression engine 400, then these steps may be followed. When the data storage system 100 does not include compression and decompression, then these steps may be skipped.

The embodiment shown in FIG. 9 comprises a step wherein the decompression circuit 508 decompresses the stored data from memory 106, as indicated in block 1000. In block 1002, the compression symbol detection circuit 510 detects the compression indicator that accompanies the stored data. In decision block 1004, the compression symbol detection circuit 510 further determines whether or not the compression indicator is the "compressed" indicator. If so, flow proceeds to block 1006 where the compression symbol detection circuit 510 signals the data output control circuit 506 that the decompressed data from the decompression circuit 508 is to be selected. In response, the data output control circuit 506 selects the decompressed data. Steps 1004 and 1006 may further include steps of detecting the type of compression algorithm used during the compression of data and the prompting to the decompression circuit 508 to decompress the data according to the type of compression algorithm used.

If decision block 1004 determines that a "not compressed" indicator exists, then the flow proceeds to block 1008 where the compression symbol detection circuit 510 signals the data output control circuit 506 to select the non-decompressed data directly from memory 106 as opposed to the decompressed data from the decompression circuit 508. At this point, the data output control circuit 506, having selected the appropriate set of data, removes the compression indicator that was added during compression, as indicated in block 1010, and the data is transferred to the host 102 (block 1012).

The flow charts of FIGS. 8-10 show the architecture, functionality, and operation of possible implementations of the memory controller designing, data writing and data reading software. In this regard, each block represents a module, segment, or portion of code, which comprises one or more executable instructions for implementing the specified logical function(s). It should also be noted that in some alternative implementations, the functions noted in the blocks may occur out of the order noted in FIGS. 8–10. For example, the two blocks 1004 and 1006 shown in succession in FIG. 10 may in fact be executed substantially concurrently or the blocks may sometimes be executed in the reverse order, depending upon the functionality involved, as will be further clarified hereinbelow.

The data writing and reading methods may be configured as a program that comprises an ordered listing of executable instructions for implementing logical functions, can be embodied in any computer-readable medium for use by an instruction execution system, apparatus, or device, such as a computer-based system, processor-controlled system, or other system that can fetch the instructions from the instruction execution system, apparatus, or device and execute the instructions. In the context of this document, a "computer-readable medium" can be any medium that can contain, store, communicate, propagate, or transport the program for use by the instruction execution system, apparatus, or device. The computer-readable medium can be, for example, an electronic, magnetic, optical, electromagnetic, infrared, or semiconductor system, apparatus, device, or propagation medium. More specific examples of the computer-readable medium include the following: an electrical connection having one or more wires, a random access memory (RAM), a read-only memory (ROM), an erasable programmable read-only memory (EPROM or Flash memory), and optical fibers. Note that the computer-readable medium could even be paper or another suitable medium upon which the program is printed, as the program can be electronically captured, for instance, by optical scanning of the paper or other medium, then compiled, interpreted or otherwise processed in a suitable manner if necessary, and then stored in a computer memory. In addition, the scope of the present invention includes embodying the functionality of the embodiments of the present disclosure in logic embodied in hardware or software-configured mediums.

It should be emphasized that the above-described embodiments of the present invention are merely examples of possible implementations, set forth for a clear understanding of the principles of the invention. Many variations and modifications may be made to the above-described embodiments of the invention without departing from the principles of the invention. All such modifications and variations are intended to be included herein within the scope of this disclosure and protected by the following claims.

We claim:

1. A memory controller for managing data within a memory component, the memory controller comprising:
   a data controller having parallel outputs;
   a data buffer having parallel inputs and parallel outputs, the parallel inputs connected to the parallel outputs of the data controller;
   a data manager connected to the parallel outputs of the data buffer, the data manager having a compression/decompression engine, a plurality of data outputs connected to memory, and a plurality of control outputs connected to memory; and
   wherein the compression/decompression engine comprises:
      a compression circuit that compresses incoming data received from the data buffer;
      a compression detector that detects whether the incoming data received from the data buffer is already in compressed form; and
      a data input control circuit that selects between the incoming data and the compressed data based on whether the incoming data is already in compressed form, and adds a compression symbol to the selected data to identify the selected data as either compressed or not compressed.

2. The memory controller of claim 1, wherein the data manager further comprises a storage device interface connected between the compression/decompression engine and memory, the storage device interface comprising a sequencer that distributes serial data among a plurality of paths leading to a plurality of memory banks of the memory.

3. The memory controller of claim 2, further comprising logic circuitry connected to the data controller, data buffer, and the data manager.

4. The memory controller of claim 1, wherein the memory comprises a plurality of memory banks, each memory bank connected to one of the plurality of data outputs and one of the plurality of control outputs from the data manager.

5. The memory controller of claim 4, wherein the memory banks comprise atomic resolution storage (ARS) devices.

6. The memory controller of claim 4, wherein the memory banks comprise magnetic random access memory (MRAM) devices.

7. The memory controller of claim 1, wherein the compression/decompression engine further comprises:
   a decompression circuit That decompresses the data retrieved from memory;
   a decompression detector that detects the compression symbol added to the data retrieved from memory: and
   a data output control circuit that selects between the data retrieved from memory and the decompressed data based on compression symbol detected by the decompression detector.

8. The memory controller of claim 1, wherein the compression detector compares the incoming data with the compressed data from the compression circuit to determine whether the incoming data is already in compressed form,
   wherein the incoming data is determined to be already in compressed form if the incoming data is not capable of further compression or if the incoming data is expanded due to compression.

9. The memory controller of claim 1, further comprising memory control logic circuitry that combined with the data controller supports direct memory access (DMA) operation to enable data transfer between a host and the memory without passing through a central processing unit (CPU).

10. The memory controller of claim 1, wherein the compression detector sends a signal to inform the compression circuit that a compression algorithm used to compress the incoming data received from the data buffer is ineffective,
   the compression circuit to switch to a different compression algorithm to compress the incoming data received from the data buffer in response to the signal.

11. A system for storing data, the system comprising:
   a host; and
   a memory component in electrical communication with the host, the memory component including:
      at least one memory bank;
      a memory controller connected to the at least one memory bank, the memory controller including:
         a data controller having a plurality of first parallel inputs and a plurality of first parallel outputs;
         a data buffer having a plurality of second parallel inputs and a plurality of second parallel outputs, wherein the first parallel outputs are connected to the second parallel inputs; and
         a data manager having a plurality of third parallel inputs and a plurality of third parallel outputs, the data manager having a compression/decompression engine that compresses and decompresses data, wherein the third parallel inputs are connected to the second parallel outputs; and wherein the compression/decompression engine comprises:

means for detecting if data received from the data buffer has already been compressed and for transmitting the data to a means for storing data when the data is detected as being compressed;

means for performing a compression algorithm on the data received from the data buffer; and means for adding a compression identifier in response to detecting that the data received from the data buffer has not already been compressed, the compression identifier indicating the algorithm used for compressing the data, and transmitting the compressed data and compression identifier to the means for storing data.

12. The system of claim 11, wherein the memory component is a memory card.

13. The system of claim 11, wherein the data controller comprises one of an advanced technology attachment (ATA) controller and a direct memory access (DMA) controller.

14. The system of claim 11, wherein each memory bank is connected to the data manager via a data line and a control line.

15. The system of claim 11, wherein the at least one memory bank further comprises a plurality of memory banks, wherein the data manager further comprises a storage device interface that transfers compressed data between the compression/decompression engine and the memory banks, the data manager to write plural blocks of data in parallel to respective memory banks.

16. The system of claim 15, wherein the storage device interface comprises an error correction code (ECC) circuit, a sequencer for separating the data into blocks, and a plurality of buffers.

17. The system of claim 15, wherein the storage device interlace comprises a segmented buffer, a sequencer for separating the data into blocks, and a plurality of error correction code (ECC) circuits.

18. The system of claim 11, wherein the compression/decompression engine further comprises:

means for retrieving data from the means for storing data;

means for detecting whether a compression identifier is present in the retrieved data;

means for transmitting the retrieved data to an output of the compression/decompression engine when no compression identifier is present;

means for decompressing the data when a compression identifier is present; and means for transmitting the decompressed data to the output of the compression/decompression engine.

19. The system of claim 11, wherein the host comprises a digital camera, the digital camera to write data to or read data from the at least one memory bank using the memory controller.

20. The system of claim 19, wherein the memory controller further comprises memory control logic circuitry that combined with the data controller supports direct memory access (DMA) operation to enable data transfer between the digital camera and the at least one memory bank.

21. The system of claim 11, wherein the means for detecting compares the data received from the data buffer with data compressed by the compression algorithm to determine whether the data received from the data buffer has already been compressed wherein the data received from the data buffer is determined to have already been compressed if the data received from the data buffer is not capable of further compression or if the data received from the data buffer is expanded due to the compression.

22. The system of claim 11, wherein the means for detecting sends a signal to inform the means for performing the compression algorithm that the compression algorithm is ineffective, and wherein the means for performing the compression algorithm switches to a different compression algorithm in response to the signal.

23. A method for transferring data between a host and memory having plural memory banks, the method comprising the steps of:

providing a data controller having a first data transfer rate;

providing a data manager that transfers data to memory at a second, different data transfer rate;

receiving data at the first data transfer rate from the data controller and transmitting the received data to the data manager at the second data transfer rate;

determining whether the received data has been previously compressed;

compressing the received data that has not been previously compressed;

separating the compressed data into a plurality of blocks along a plurality of parallel channels; and transferring the blocks in parallel to respective memory banks along the plurality of parallel channels.

24. The method of claim 23, further comprising the steps of:

selecting desired storage capacity and data transfer rate specifications;

determining a number and type of memory banks to meet the desired specifications; and providing the desired number and type of memory banks in a parallel configuration based on the data controller and desired specifications.

25. The method of claim 23, further comprising the step of adding a compression identifier along with the compressed data that indicates that the data has been compressed.

26. The method of claim 25, further comprising the steps of:

retrieving data from the memory;

determining whether the retrieved data has a compression identifier;

when the retrieved data has a compression identifier, detecting the compression algorithm used to compress the data;

decompressing the data using a decompression algorithm that is reciprocal to the compression algorithm; and transferring the decompressed data to the host.

27. The method of claim 23, wherein the data controller is one of a group consisting of an ATA controller and a DMA controller.

28. The method of claim 23, wherein determining whether the data has been previously compressed comprises comparing the received data with the compressed data.

29. The method of claim 28, wherein the received data is determined to be previously compressed if the received data is not capable of further compression or if the received data is expanded due to compression.

30. The method of claim 23, wherein the host comprises a digital camera, the method further comprising performing direct memory access (DMA) transfer between the digital camera and the memory using the data controller.

31. The method of claim 23, further comprising:

providing a signal to indicate that a compression algorithm for compressing the received data is ineffective; and in response to the signal, switching to a different compression algorithm to compress the received data.

32. A memory card comprising:

a plurality of memory banks;

a memory controller connected to the plurality of memory banks, the memory controller comprising:
- a data controller having a plurality of first parallel outputs;
- a data buffer having a plurality of second parallel inputs and a plurality of second parallel outputs, the second parallel inputs being connected to the first parallel outputs; and
- a data manager having a plurality of third parallel inputs connected to the second parallel outputs, the data manager comprising a compression/decompression engine and a storage device interface, the storage device interface having a plurality of outputs connected to the plurality of memory banks, the compression/decompression engine having a compression detector that detects whether data received from the data buffer is already in compression form,
the data manager to write plural blocks of data in parallel to respective memory banks, the data written being selected dependent on whether the compression detector detects that the data received from the data buffer is in compressed form.

33. The memory card of claim 32, wherein the data controller is an ATA 66 controller.

34. The memory card of claim 32, wherein the compression/decompression engine comprises:
- a compression circuit to compress incoming data received from the data buffer to generate compressed data;
- wherein the compression detector compares the incoming data with the compressed data to determine whether the incoming data received from the data buffer is already in compressed form, and the incoming data is determined to be already in compressed form if the incoming data is not capable of further compression or if the incoming data is expanded due to compression; and
- a data input control circuit to select between the incoming data and the compressed data based on whether the incoming data is already in compressed form, and to add a compression indicator to the selected data to identify whether the selected data is compressed by the compression circuit or was already in compressed form.

* * * * *